United States Patent
Shah et al.

(10) Patent No.: US 7,434,630 B2
(45) Date of Patent: Oct. 14, 2008

(54) SURFACE INSTRUMENTATION CONFIGURATION FOR DRILLING RIG OPERATION

(75) Inventors: Vimal V. Shah, Sugarland, TX (US); Donald G. Kyle, Plano, TX (US)

(73) Assignee: Halliburton Energy Services, Inc., Houston, TX (US)

(*) Notice: Subject to any disclaimer, the term of this patent is extended or adjusted under 35 U.S.C. 154(b) by 204 days.

(21) Appl. No.: 10/958,861

(22) Filed: Oct. 5, 2004

(65) Prior Publication Data

US 2006/0070743 A1 Apr. 6, 2006

(51) Int. Cl.
*E21B 47/16* (2006.01)
(52) U.S. Cl. .......................... 175/40; 175/423
(58) Field of Classification Search .............. 175/40, 175/423; 367/82; 340/853.7, 854.4, 854.6
See application file for complete search history.

(56) References Cited

U.S. PATENT DOCUMENTS

| | | | |
|---|---|---|---|
| 3,876,972 A * | 4/1975 | Garrett | 367/82 |
| 4,027,282 A | 5/1977 | Jeter | |
| 4,496,203 A | 1/1985 | Meadows | |
| 4,802,143 A * | 1/1989 | Smith | 367/82 |
| 4,823,919 A | 4/1989 | Hayatdavoudi | |
| 4,839,644 A * | 6/1989 | Safinya et al. | 340/854.3 |
| 2004/0060696 A1* | 4/2004 | Schultz et al. | 166/250.01 |
| 2004/0163807 A1 | 8/2004 | Vercaemer | |
| 2005/0051324 A1* | 3/2005 | Mosing et al. | 166/66 |
| 2005/0167094 A1* | 8/2005 | Streich et al. | 166/66 |

OTHER PUBLICATIONS

International Search Report—PCT/US2005/029050, Authorized Office—Luis-Miguel Paredes Sanchez,(Aug. 12, 2005), 10.

* cited by examiner

*Primary Examiner*—Hoang Dang
(74) *Attorney, Agent, or Firm*—Schwegman, Lundberg & Woessner, P.A.

(57) ABSTRACT

One embodiment includes an apparatus comprising a surface slip to support drill tubing and having a communications instrument.

64 Claims, 4 Drawing Sheets

SURFACE INSTRUMENTATION CONFIGURATION FOR DRILLING RIG OPERATION

TECHNICAL FIELD

The application relates generally to communications. In particular, the application relates to acoustic communications for drilling rig-related operations.

BACKGROUND

During drilling operations for extraction of hydrocarbons, a variety of communication and transmission techniques have been attempted to provide real time data from the vicinity of the bit to the surface during various phases of drilling rig operations. The use of measurements while drilling (MWD) with real time data transmission provides substantial benefits during a drilling operation. For example, monitoring of downhole conditions allows for an immediate response to potential well control problems and improves mud programs.

Measurement of parameters such as weight on bit, torque, wear and bearing condition in real time provides for more efficient drilling operations. In fact, faster penetration rates, better trip planning, reduced equipment failures, fewer delays for directional surveys, and the elimination of a need to interrupt drilling for abnormal pressure detection is achievable using MWD techniques.

One current approach to provide real time data from the vicinity of the drill bit to the surface includes acoustic communications. Typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission. Such reflective and refractive interference causes interbit interference among the bits of data being transmitted.

Acoustic communications are further complicated when surface slips are used on the drill rig floor. For example, surface slips may be used to provide support during periods when drill stand is being added or removed to the drill pipe. In particular, during drilling operations additional drill pipe may be periodically installed to increase the depth of such drill pipe downhole or remove as part of a tripping operation. The surface slips generally surround an opening in the rig floor through which the upper end of the uppermost joint of drill pipe protrudes. The surface slips hold the protruded drill pipe in position (a few feet above the surface of the rig floor) to allow rig personnel and/or automated handling equipment to attach or remove drill pipe. However, the surface slips may act as a reflective point for the acoustic communications between downhole and surface instrumentation, thereby distorting and/or damping such communications.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for a surface instrumentation configuration for drilling rig-related operations are described. In the following description, numerous specific details are set forth. However, it is understood that embodiments of the invention may be practiced without these specific details. In other instances, well-known circuits, structures and techniques have not been shown in detail in order not to obscure the understanding of this description.

While described with reference to communications during drilling rig-related operations, embodiments may be used any other types of environments for acoustic communications. Additionally, some embodiments of the invention may be applicable during both Logging While Drilling (LWD) and Measurement While Drilling (MWD) operations while the drill pipe is stationary. Some embodiments may be performed during a logging while tripping operation, zero emissions testing, drill stem testing, etc. Additionally, some embodiments are applicable not only during drilling, but throughout the life of a wellbore including, but not limited to, during logging, drill stem testing, completing and production.

As further described below, some embodiments may include one or more instrumented surface slips. In particular, surface slip(s), which typically provide support to the drill pipe during various phases of the drilling rig-related operations, may include a communications receiver and/or transmitter. In some embodiments, the surface slip(s) may include an acoustic receiver (such as an accelerometer) positioned approximately at or near its bottom end. In some embodiments, the surface slip(s) may include an acoustic transmitter to transmit data communications to downhole instrumentation. Accordingly, as described, embodiments enable high-speed telemetry operations along the drill pipe while the drill pipe is in the surface slips. In particular, embodiments may allow for acoustic communications essentially independent of interference by the surface slip(s). Moreover, embodiments allow a rig crew to install and uninstall instrumentation as part of normal rig procedures to change a pipe stand. Further, some embodiments may incorporate instrumentation into other surface equipment. For example, such instrumentation may be incorporated into pack-off material.

Figure 1:
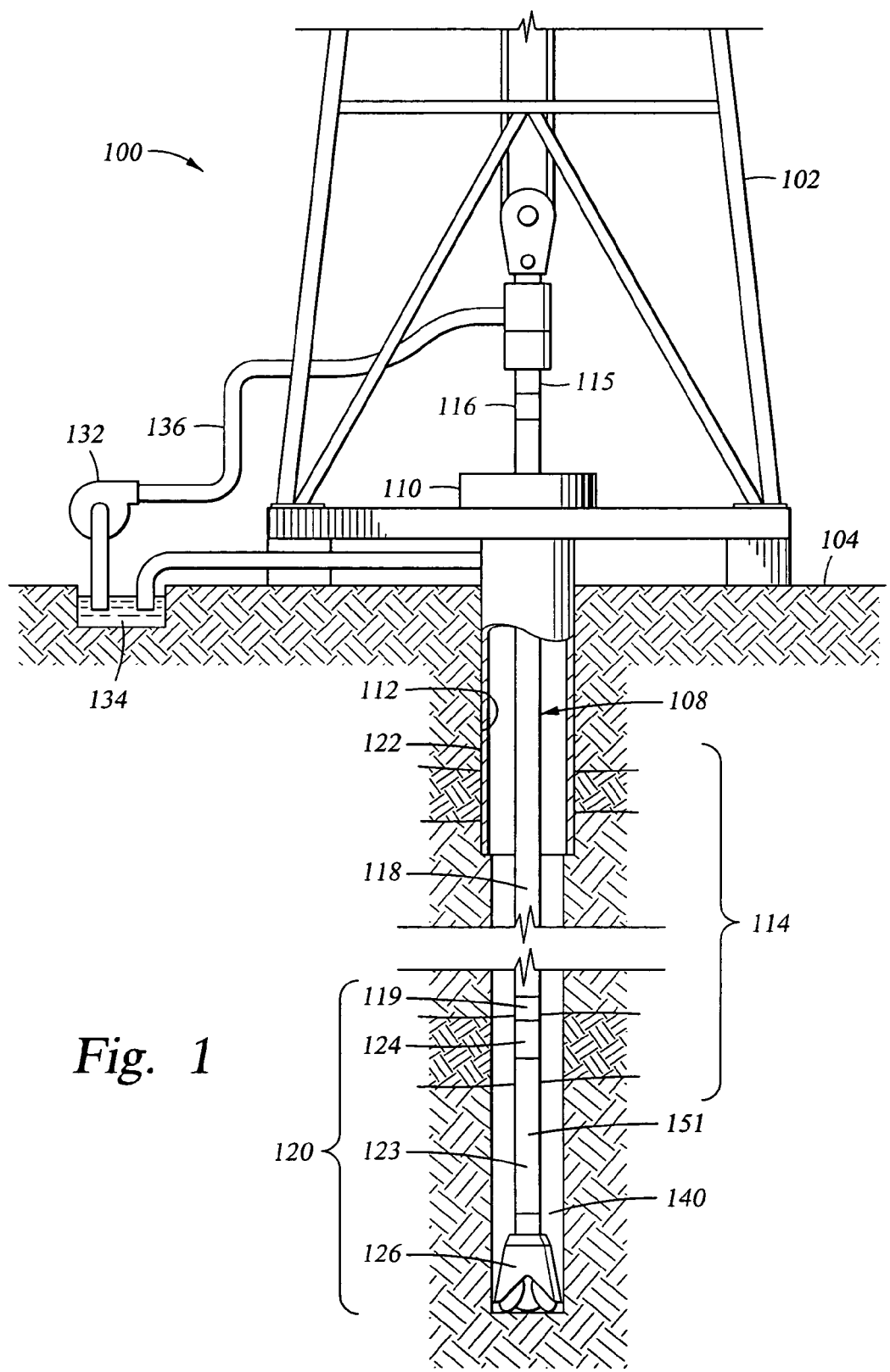
FIG. 1 illustrates a system for drilling operations, according to some embodiment of the invention.

FIG. 1 illustrates a system for drilling operations, according to some embodiments of the invention. A system 100 includes a drilling rig 102 located at a surface 104 of a well.

The drilling rig 102 provides support for a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include a drill collar 122, a downhole tool 124 and a drill bit 126. The downhole tool 124 may be any of a number of different types of tools including Measurement While Drilling (MWD) tools, Logging While Drilling (LWD) tools, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor (not shown) that is downhole. The drill collar 122 may be used to add weight to the drill bit 126. The drill collar 122 also may stiffen the bottom hole assembly 120 to allow the bottom hole assembly 120 to transfer the weight to the drill bit 126. Accordingly, this weight provided by the drill collar 122 also assists the drill bit 126 in the penetration of the surface 104 and the subsurface formations 114.

During drilling operations, a mud pump 132 may pump drilling fluid (known as "drilling mud") from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, where such fluid is filtered. Accordingly, the drilling fluid can cool the drill bit 126 as well as provide for lubrication of the drill bit 126 during the drilling operation. Additionally, the drilling fluid removes the cuttings of the subsurface formations 114 created by the drill bit 126.

The drill string 108 may include one to a number of different sensors 151, which monitor different downhole parameters. Such parameters may include the downhole temperature and pressure, the various characteristics of the subsurface formations (such as resistivity, density, porosity, etc.), the characteristics of the borehole (e.g., size, shape, etc.), etc. The drill string 108 may also include an acoustic transmitter 123 that transmits telemetry signals in the form of acoustic vibrations in the tubing wall of the drill sting 108. An acoustic receiver 115 is coupled to the kelly 116 to receive transmitted telemetry signals. One or more repeaters 119 may be provided along the drill string 108 to receive and retransmit the telemetry signals. The repeaters 119 may include both an acoustic telemetry receiver and an acoustic telemetry transmitter configured similarly to the acoustic receiver 115 and the acoustic transmitter 123.

Some embodiments of different positions of surface instrumentation for communications downhole during various drilling/logging operations are now described in conjunction with FIGS. 2-6. In particular, FIGS. 2-6 illustrate different configurations for surface slips and pack-off material having surface receivers and/or surface transmitters, according to some embodiments of the invention.

Figure 2:
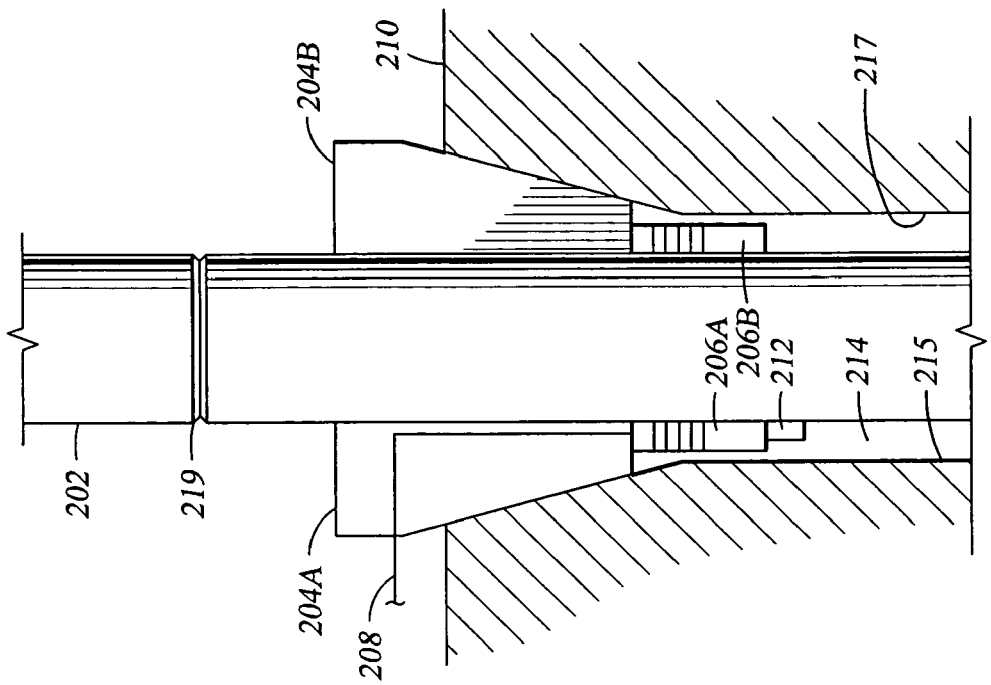
FIG. 2 illustrates surface slips having a surface receiver and a surface transmitter, according to some embodiments of the invention.

FIG. 2 illustrates surface slips having a surface receiver and a surface transmitter, according to some embodiments of the invention. FIG. 2 illustrates a tubing 202 positioned in a borehole 217. The tubing 202 may be a drill string (such as the drill string 108 shown in FIG. 1), a wired pipe, a production tubing, etc. The borehole 217 includes sides 215, which may include casing. An annulus 214 is formed between the tubing 202 and the sides 215. Surface slips 204A-204B are positioned within the annulus 214 at the rig floor 210. The surface slips 204A-204B may include gripping elements adjacent to the tubing 202 used to attach the surface slips 204A-204B to the tubing 202. The surface slips 204A-204B may be manual or hydraulic. The surface slips 204A-204B may provide support to the tubing 202. For example, the surface slips 204A-204B may be inserted along the tubing 202 when a pipe stand is being added or removed there from. As shown, the tubing 202 may include a joint 219, which may be the location where a pipe stand is added or removed.

As shown, the surface slips 204A-204B may include instrumentation. The instrumentation may include a surface receiver 212 and surface transmitters 206A-206B. The surface receiver 212 may be positioned at or near the top of the surface slips 204A-204B for simplicity of implementation. However, if the surface receiver 212 is positioned near the top or above the surface slips 204A-204B, the surface receiver 212 may receive acoustic signals that have undergone significant dissipation in the rig floor. In some embodiments, the surface receiver 212 may be positioned at or near the bottom end of the surface slips 204A-204B, thereby positioning the surface receiver 212 below the rig floor. In this configuration, the surface receiver 212 may receive the acoustic signals from downhole before such signals may be subject to dissipation. This position of the surface receiver 212 may increase the signal to noise ratio of the received acoustic signal, thereby potentially increasing the data bandwidth. The surface receiver 212 may be positioned approximately at or near the bottom end of the surface slip 204A, relative to its position in the borehole 217. The surface transmitter 206A and the surface transmitter 206B are respectively positioned approximately at or near the top end of the surface slip 204A and the top end of the surface slip 204B, relative to their positions in the borehole 217. The surface receiver 212 may be a number of different types of acoustic receivers including an accelerometer, a strain gage, etc. In some embodiments, the surface receiver 212 and/or the surface transmitters 206A-206B may be attached (bolted, welded, etc.) to the surface slips 206A-206B. In some embodiments, the surface receiver 212 and/or the surface transmitters 206A-206B may be manufactured as a single object.

The surface slip 206A may include a signal line 208. The signal line 208 may provide a power signal to the surface transmitter 206A and/or the surface receiver 212. In some embodiments, the signal line 208 may provide a communications signal (such as data communications) to and from the surface transmitter 206A and/or the surface receiver 212. In some embodiments, the surface slips 206A-206B may be without the signal line 208 (as shown by surface slip 206B). Accordingly, a power source (such as a battery) may be a part of the surface transmitters 206A-206B and/or the surface receiver 212. Additionally, communications with the surface transmitters 206A-206B and/or the surface receiver 212 may be through wireless communications or other wired coupling (not shown). For example, the surface receiver 212 may include a storage medium to store data communications received from downhole. Such data may be downloaded there from subsequent to the removal of the surface slips 204A-204B from their support of the tubing 202.

Therefore, as described, some embodiments include an acoustic surface receiver positioned below the surface slips 206 to receive acoustic communications from downhole. Such positioning allows for acoustic communications along the tubing that is essentially independent of interference (such as reflections) caused by the surface slips 206.

Figure 3:
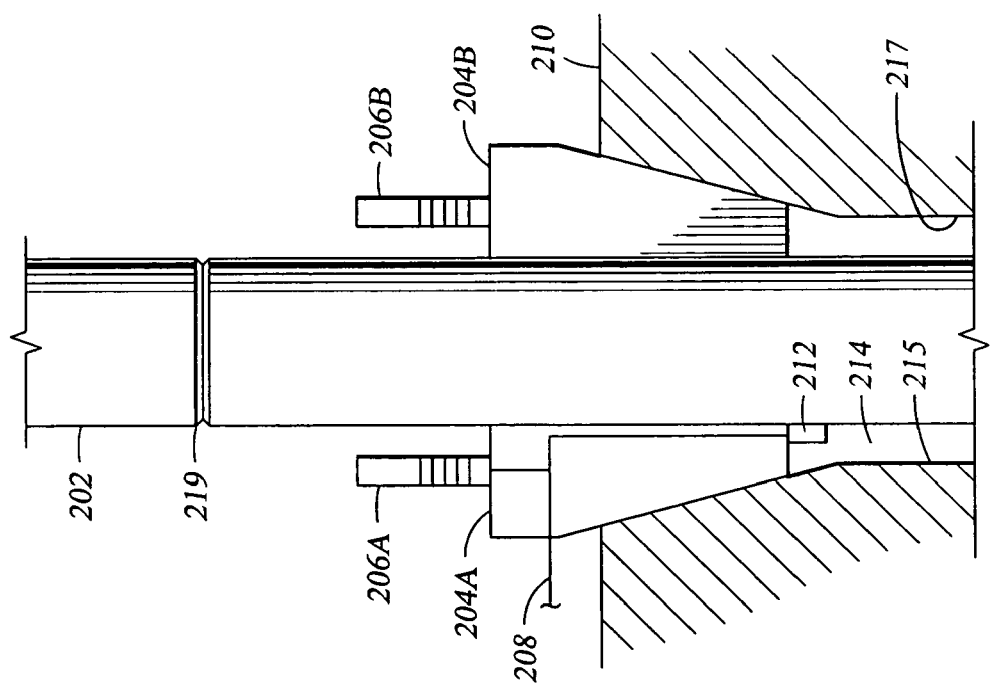
FIG. 3 illustrates surface slips having a surface receiver and a surface transmitter, according to some embodiments of the invention.

FIG. 3 illustrates surface slips having a surface receiver and a surface transmitter, according to some embodiments of the invention. In particular, FIG. 3 illustrates a configuration of the surface slips wherein both the surface receiver and the surface transmitter are positioned approximately at or near the bottom end of the surface slips.

As shown, the surface slips 204A-204B may include instrumentation. Similar to the configuration shown in FIG. 2, the instrumentation may include the surface receiver 212 and the surface transmitters 206A-206B. The surface transmitter 206A and the surface transmitter 206B are respectively positioned approximately at or near the bottom end of the surface slip 204A and the bottom end of the surface slip 204B, relative to their positions in the borehole 217. The surface receiver 212 is positioned approximately near or below the bottom end of the surface transmitter 206A, relative to its position in the borehole 217.

Accordingly, as shown, the surface receiver 212 is a given distance from the gripping elements of the surface slip 204A used to attached the surface slip 204A to the tubing 202. In some embodiments, such distance may be dependent on the wavelength of the acoustic signal being transmitted from downhole to be received by the surface receiver 212. In particular, this distance may be set to avoid null points caused by the reflections by the surface slip 204A. In an embodiment, the surface receiver 212 may be approximately $\lambda/16$ and $3\lambda/8$ from the gripping elements of the surface slip 204A. In an embodiment, the acoustic signal along the tubing 202 may operate in a frequency band of approximately 600-1800 Hertz. Accordingly, in some embodiments, the distance from the gripping elements of the surface slip 204A and the surface receiver 212 is approximately 1.7-3 feet.

Figure 4:
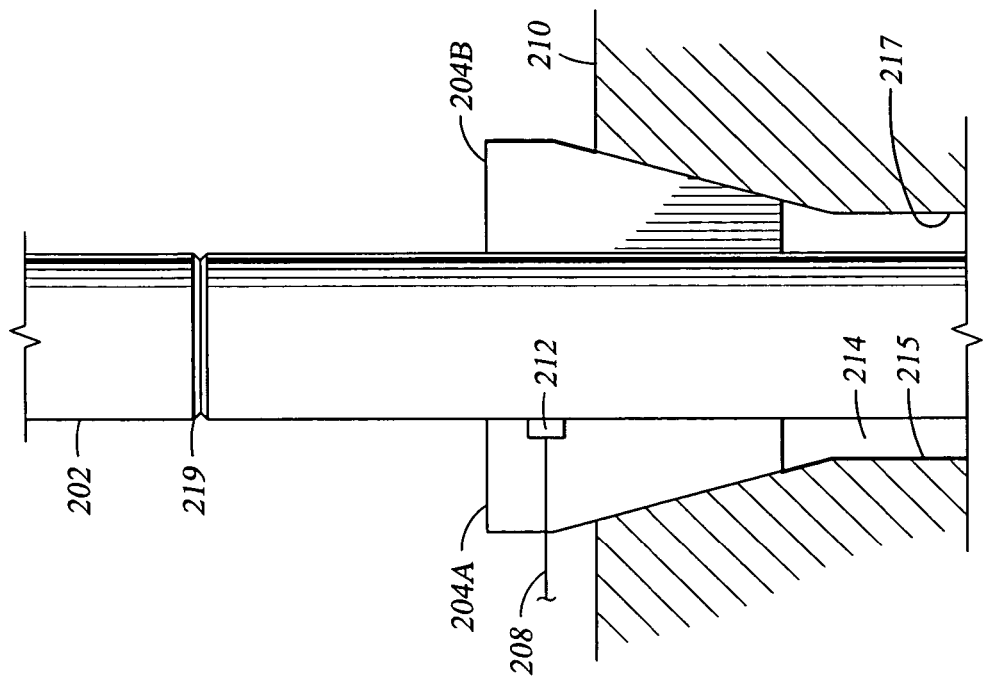
FIG. 4 illustrates a surface slip having a surface receiver, according to some embodiments of the invention.

FIG. 4 illustrates a surface slip having a surface receiver, according to some embodiments of the invention. In particular, FIG. 4 illustrates a configuration wherein a surface slip only includes a surface receiver positioned approximately at or near the bottom end of the surface slip. As shown, the surface slip 204A may include the surface receiver 212. As shown, the surface receiver 212 is positioned approximately at or near the bottom end of the surface slip 204A, relative to its position in the borehole 217.

Figure 5:
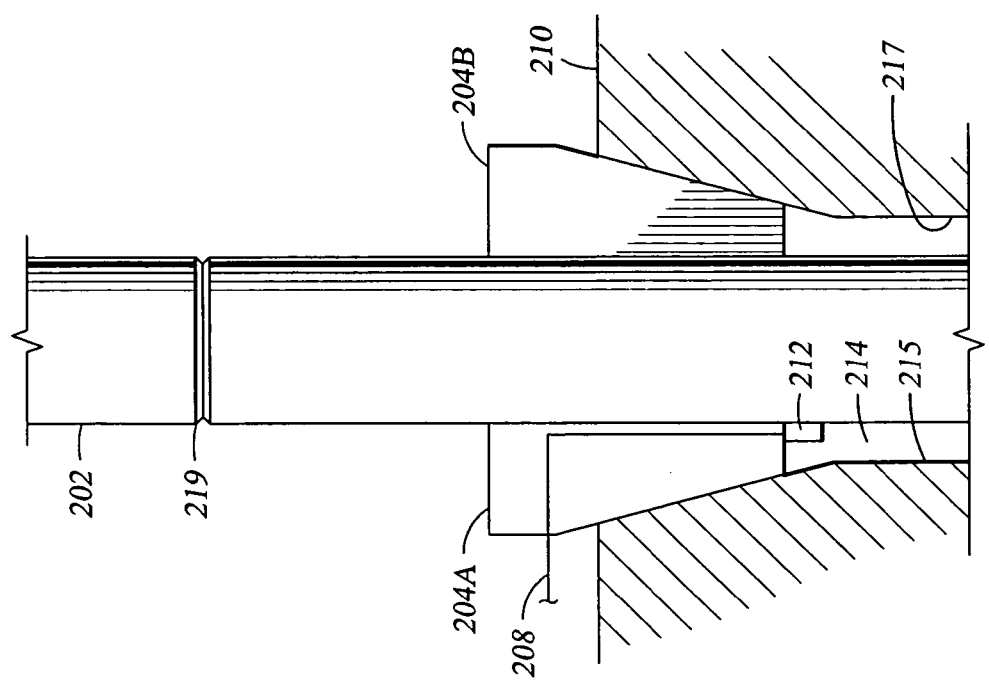
FIG. 5 illustrates a surface slip having a surface receiver, according to some embodiments of the invention.

FIG. 5 illustrates a surface slip having a surface receiver, according to some embodiments of the invention. In particular, FIG. 4 illustrates a configuration wherein a surface receiver may be positioned at a location that is not approximately at or near the bottom end of the surface slip. As shown, the surface slip 204A may include the surface receiver 212. As shown, the surface receiver 212 is positioned within the surface slip 204A (and not a given end of the surface slip 204A).

Figure 6:
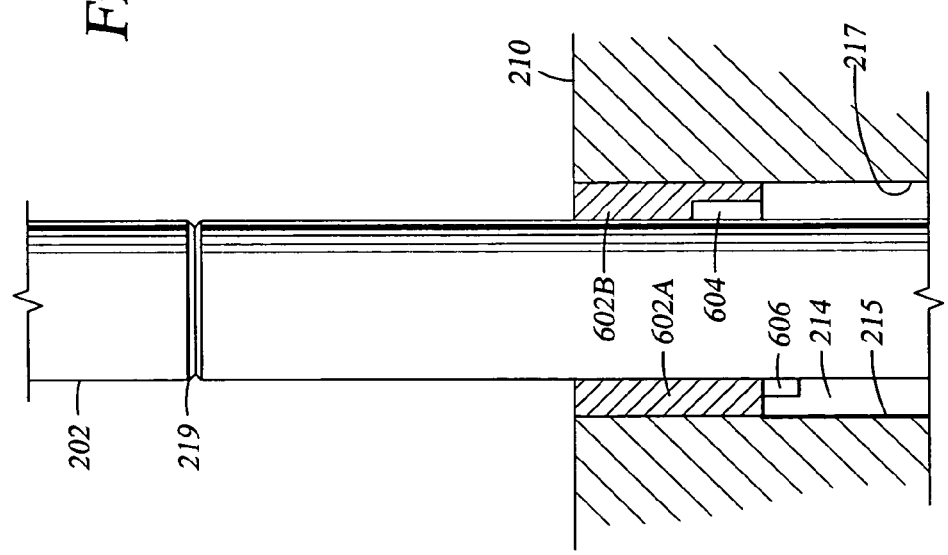
FIG. 6 illustrates pack-off material having a surface receiver and a surface transmitter, according to some embodiments of the invention.

FIG. 6 illustrates pack-off material having a surface receiver and a surface transmitter, according to some embodiments of the invention. In particular, FIG. 6 illustrates a pack-off material 602A-602B that may be used to plug the borehole around the tubing 202. The pack-off material 602A-602B may be positioned around the tubing 202 to maintain the pressure downhole.

As shown, the pack-off material 602A-602B may include instrumentation. The instrumentation may include a surface receiver 606 and a surface transmitter 604. The surface receiver 606 may be positioned approximately at or near the bottom end of the pack-off material 602A, relative to its position in the borehole 217. The surface transmitter 604 may be positioned approximately at or near the bottom end of the pack-off material 602B, relative to its position in the borehole 217. The surface receiver 606 may be a number of different types of acoustic receivers including an accelerometer, a strain gage, etc. In some embodiments, the surface receiver 606 and/or the surface transmitter 604 may be embedded or attached (e.g., using an adhesive, etc.) to the pack-off material 602A-602B.

Although not shown, the pack-off material 602A-602B may include signal lines similar to the signal line 208 (described above). Such signal lines may provide power, data, etc to the surface receiver 606 and/or the surface transmitter 604. In some embodiments, the pack-off material 602A-602B may be without signal lines. Accordingly, a power source (such as a battery) may be a part of the pack-off material 602A-602B. Additionally, communications with the surface receiver 606 and/or the surface transmitter 604 may be through wireless communications. The surface receiver 606 may include a storage medium to store data communications received from downhole. Such data may be downloaded there from subsequent to the removal of the pack-off material 602A-602B from the annulus 214.

Embodiments of the configuration of the surface slips and the packing material are not limited to those shown in FIGS. 2-6. For example, a surface slip may include a surface receiver and a surface transmitter at its top end, relative to the borehole. To further illustrate, the pack-off material may include both a surface receiver and a surface transmitter. Further, in an embodiment, the surface receiver and/or the surface transmitter may be positioned at a location that is not approximately at or near the bottom end of the pack-off material. Additionally, while described such that the surface receiver is a given distance from the gripping elements of the surface slip because of the surface transmitter, some embodiments allow for such a distance independent of the surface transmitter. Accordingly, the surface slip may include an extension beyond the gripping elements to allow for such a distance.

Figure 7:
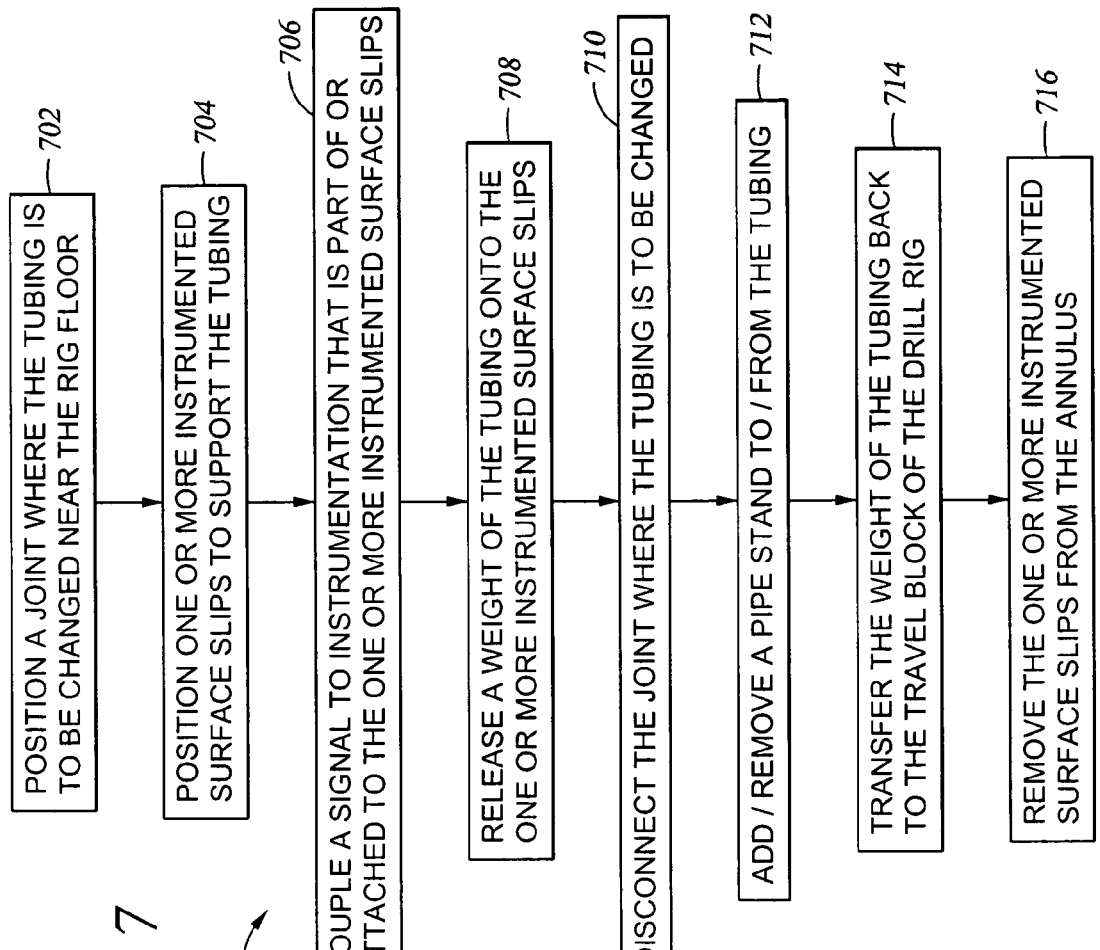
FIG. 7 illustrates a flow diagram for adding/removing a pipe stand to/from a tubing, according to some embodiments of the invention.

FIG. 7 illustrates a flow diagram for adding/removing a pipe stand to/from a tubing, according to some embodiments of the invention. In particular, FIG. 7 includes a flow diagram 700 that illustrates used of an instrumented surface slip for the adding/removing pipe stand to/from a tubing, according to some embodiments of the invention.

In block 702, a joint where the tubing is to be changed is positioned near the rig floor. With reference to the embodiment of FIG. 2, assume that the joint 219 of the tubing 202 is where the tubing 202 is to be changed. Accordingly, the hoisting system of the system 100 (shown in FIG. 1) adjusts the traveling block to place the tubing 202 in a position such that the joint 219 is just above the rig floor 210. Control continues at block 704.

In block 704, one or more instrumented surface slips are positioned to support the tubing. With reference to the embodiment of FIG. 2, the surface slips 204A-204B are positioned in the annulus 214 along the sides of the tubing 202. Additionally, the surface slips 204A-204B may be coupled to the tubing 202. Control continues at block 706.

In block 706, a signal is coupled to instrumentation that is a part of or attached to the instrumented surface slips. With reference to the embodiment of FIG. 2, a signal may be coupled to the surface receiver 212 and/or the surface transmitter 206A through the signal line 208. Such signals may include power, data, etc. For example, a power and/or data signal line may be coupled to a data acquisition and processing system (not shown) to supply such signals to the surface receiver 212 and/or the surface transmitter 206A. Control continues at block 708.

In block 708, a weight of the tubing is released onto the instrumented surface slips. With reference to the embodiments of FIGS. 1 and 2, rig personnel may cause the drilling rig 102 to release the weight of the tubing 202 onto the surface slips 204A-204B to set the surface slips 204A-204B in position in the annulus 214. In particular, rig personnel may release the weight of the tubing 202 from the hoisting system of the drilling rig 102 onto the surface slips 204A-204B. Control continues at block 710.

In block 710, the joint where the tubing is to be changed is disconnected. With reference to the embodiment of FIG. 1, rig personnel may disconnect the joint 219 of the tubing 202. Control continues at block 712.

In block 712, a pipe stand is added/removed to/from the tubing. With reference to the embodiment of FIG. 2, rig personnel may add/remove a pipe stand from the tubing 202. Additionally, the rig personnel may reconnect the joint 219. Control continues at block 714.

In block 714, the weight of the tubing is transferred back to the travel blocks of the drilling rig. With reference to the embodiments of FIGS. 1 and 2, the weight of the tubing 202 is transferred back to the travel block that is part of the hoisting system of the drilling rig 102. Control continues at block 716.

In block 716, the instrumented surface slip(s) are removed from the annulus. With reference to the embodiment of FIG. 2, rig personnel may remove the surface slips 204A-204B from their position in the annulus 214. Additionally, the acoustic communications between the instrumentation in the surface slips 204A-204B and downhole instrumentation may occur at any point while the surface slips 204A-204B are adjacent to the tubing 202. Accordingly, some embodiments may provide acoustic communications using the instrument surface slips at different periods of the operations when the tubing is stationary.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for a surface instrumentation configuration for drilling rig-related operations, in accordance with some embodiments of the invention. A number of figures show flow diagrams illustrating operations for a surface instrumentation configuration for drilling rig-related operations, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. An apparatus comprising:
   a surface slip to support drill tubing and having a top end that is on top of a bottom end relative to a surface, wherein the surface slip includes a communications instrument positioned approximately at or below the bottom end.

2. The apparatus of claim 1, wherein the surface slip includes a surface transmitter for transmission of data downhole.

3. The apparatus of claim 2, wherein the surface transmitter is positioned approximately at or below the bottom end.

4. The apparatus of claim 2, wherein the surface transmitter is positioned approximately at or above the top end.

5. The apparatus of claim 1, wherein the surface slip includes a manual surface slip.

6. The apparatus of claim 1, wherein the surface slip includes a hydraulic surface slip.

7. The apparatus of claim 1, wherein the communications instrument includes a sensor to receive communication from downhole.

8. The apparatus of claim 7, wherein a distance between griping elements of the surface slip and the sensor is dependent on a wavelength of an acoustic signal that is to be propagated along the drill tubing and to be received by the sensor.

9. The apparatus of claim 8, wherein the distance is between approximately $1/16$ of the wavelength and $3/8$ of the wavelength.

10. The apparatus of claim 8, wherein the acoustic signal is to propagate along the drill tubing in a frequency band between approximately 600 Hertz and 1800 Hertz.

11. The apparatus of claim 7, wherein a distance between griping elements of the surface slip and the sensor is between approximately 1.7 feet and 3 feet.

12. The apparatus of claim 7, wherein the sensor comprises an accelerometer.

13. The apparatus of claim 7, wherein the sensor comprises a strain gage.

14. The apparatus of claim 1, wherein the drill tubing comprises a drill string.

15. The apparatus of claim 1, wherein the drill tubing comprises a wired pipe.

16. The apparatus of claim 1, wherein the drill tubing comprises a production tubing.

17. An apparatus comprising:
    a surface slip to support drill pipe and having an acoustic receiver within or attached thereto.

18. The apparatus of claim 17, wherein a distance between griping elements of the surface slip and the acoustic receiver is dependent on a wavelength of an acoustic signal that is to be propagated along the drill pipe and to be received by the acoustic receiver.

19. The apparatus of claim 18, wherein the distance is between approximately $1/4$ the wavelength.

20. The apparatus of claim 19, wherein the acoustic signal is to propagate along the drill tubing in a frequency band between approximately 600 Hertz and 1800 Hertz.

21. The apparatus of claim 17, wherein a distance between griping elements of the surface slip and the sensor is between approximately 2.4 feet.

22. The apparatus of claim 17, wherein the acoustic receiver is positioned approximately at or below a bottom end of the surface slip.

23. The apparatus of claim 17, wherein the surface slip includes an acoustic transmitter.

24. The apparatus of claim 23, wherein the acoustic transmitter is positioned approximately at or below a bottom end of the surface slip.

25. The apparatus of claim 24, wherein the acoustic receiver is positioned approximately below the acoustic transmitter.

26. The apparatus of claim 25, wherein a length of the acoustic transmitter is dependent on a wavelength of an acoustic signal that is to be propagated along the drill pipe and to be received by the acoustic receiver.

27. The apparatus of claim 26, wherein the length is between approximately 1/16 of the wavelength and 3/8 of the wavelength.

28. The apparatus of claim 26, wherein the acoustic signal is to propagate along the drill tubing in a frequency band between approximately 600 Hertz and 1800 Hertz.

29. The apparatus of claim 25, wherein a length of the acoustic transmitter is between approximately 1.7 feet and 3 feet.

30. The apparatus of claim 23, wherein the acoustic transmitter is positioned approximately at or above a top end of the surface slip.

31. The apparatus of claim 17, wherein the acoustic receiver comprises an accelerometer.

32. The apparatus of claim 17, wherein the acoustic receiver comprises a strain gage.

33. The apparatus of claim 17, wherein the drill pipe comprises a drill string.

34. The apparatus of claim 17, wherein the drill pipe comprises a wired pipe.

35. A method comprising:
monitoring, using a communication instrument, acoustical wave propagation along a tubing approximately at or below a surface slip to support the tubing, wherein the communication instrument is part of the surface slip.

36. The method of claim 35, wherein monitoring acoustical wave propagation along the tubing approximately at or below the surface slip to support the tubing comprises monitoring acoustical wave propagation along the tubing with an acoustic receiver that is below the surface slip.

37. The method of claim 36, wherein a distance between griping elements of the surface slip and the acoustic receiver is dependent on a wavelength of the acoustic wave propagation.

38. The method of claim 37, wherein the distance is between approximately 1/16 of the wavelength and 3/8 of the wavelength.

39. The method of claim 37, wherein the acoustic wave propagation is in a frequency band between approximately 600 Hertz and 1800 Hertz.

40. The method of claim 36, wherein a distance between griping elements of the surface slip and the acoustic receiver is between approximately 1.7 feet and 3 feet.

41. The method of claim 35, wherein monitoring acoustical wave propagation along the tubing comprising monitoring acoustic wave propagation along a drill string.

42. The method of claim 35, wherein monitoring acoustical wave propagation along the tubing comprising monitoring acoustic wave propagation along a wired pipe.

43. The method of claim 35, wherein monitoring acoustical wave propagation along the tubing comprising monitoring acoustic wave propagation along a production tubing.

44. The method of claim 35, wherein monitoring acoustical wave propagation along the tubing approximately at or below the surface slip comprises monitoring acoustical wave propagation along the tubing approximately at or below the surface slip using an accelerometer positioned approximately at or below the surface slip.

45. The method of claim 35, wherein monitoring acoustical wave propagation along the tubing approximately at or below the surface slip comprises monitoring acoustical wave propagation along the tubing approximately at or below the surface slip using a strain gage positioned approximately at or below the surface slip.

46. The method of clam 35, further comprising transmitting acoustical wave propagation along the tubing using a surface transmitter mounted on the surface slip.

47. A method comprising:
positioning a surface slip to support a drill pipe, wherein the surface slip includes a communication instrument that is positioned approximately at or below a bottom end of the surface slip; and
coupling signal to the communications instrument positioned approximately at or below a bottom end of the surface slip.

48. The method of claim 47, further comprising releasing a weight of the drill pipe onto the surface slip.

49. The method of claim 47, further comprising disconnecting a joint of the drill pipe that is near the surface slip.

50. The method of claim 49, further comprising adding a pipe stand to the drill pipe.

51. The method of claim 49, further comprising removing a pipe stand from the drill pipe.

52. The method of claim 47, wherein positioning the surface slip to support the drill pipe comprises positioning the surface slip in a borehole wherein the drill pipe is located.

53. The method of claim 47, wherein coupling the signal to the communications instrument positioned approximately at or below the bottom end of the surface slip comprises coupling the signal to an acoustic receiver.

54. The method of claim 47, wherein coupling the signal to the communications instrument comprises coupling the signal to an accelerometer.

55. The method of claim 47, wherein coupling the signal to the communications instrument comprises coupling the signal to a strain gage.

56. The method of claim 47, wherein coupling the signal to the communications instrument comprises coupling a power signal to the communications instrument.

57. The method of claim 47, wherein coupling the signal to the communications instrument comprises coupling a communications signal to the communications instrument.

58. The method of claim 47, wherein coupling the signal to the communications instrument comprises coupling the signal to an acoustic transmitter positioned approximately at or below the bottom end of the surface slip.

59. The method of claim 58, wherein coupling the signal to the communications instrument comprises coupling the signal to an acoustic receiver positioned approximately at or below a bottom end of the acoustic transmitter.

60. The method of claim 59, further comprising operating the acoustic receiver to receive an acoustic signal that is propagated along the drill pipe.

61. The method of claim 60, wherein a length of the acoustic transmitter is dependent on a wavelength of the acoustic signal.

62. The method of claim 61, wherein the length is between approximately 1/16 of the wavelength and 3/8 of the wavelength.

63. The method of claim 62, wherein the acoustic signal is to propagate along the drill pipe in a frequency band between approximately 600 Hertz and 1800 Hertz.

64. The method of claim 60, wherein a length of the acoustic transmitter is between approximately 1.7 feet and 3 feet.

* * * * *

UNITED STATES PATENT AND TRADEMARK OFFICE
CERTIFICATE OF CORRECTION

PATENT NO. : 7,434,630 B2  Page 1 of 1
APPLICATION NO. : 10/958861
DATED : October 14, 2008
INVENTOR(S) : Vimal V. Shah et al.

It is certified that error appears in the above-identified patent and that said Letters Patent is hereby corrected as shown below:

In column 10, line 27, in Claim 47, after "coupling" insert -- a --.

Signed and Sealed this

Fourteenth Day of September, 2010

David J. Kappos
*Director of the United States Patent and Trademark Office*